A. E. STANHOPE.
CALIPERS.
APPLICATION FILED OCT. 30, 1916.
1,237,114.  Patented Aug. 14, 1917.
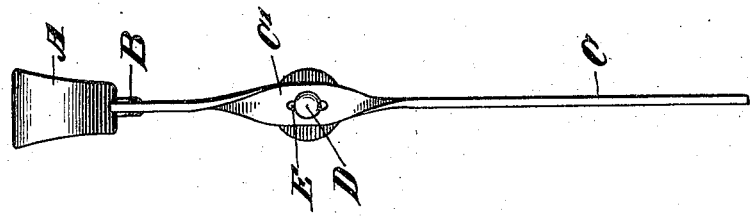
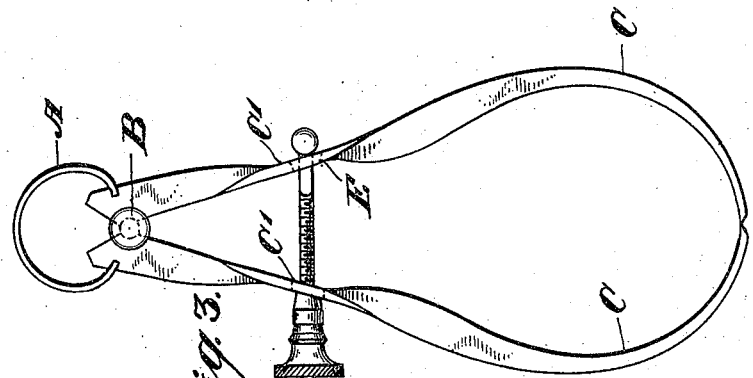
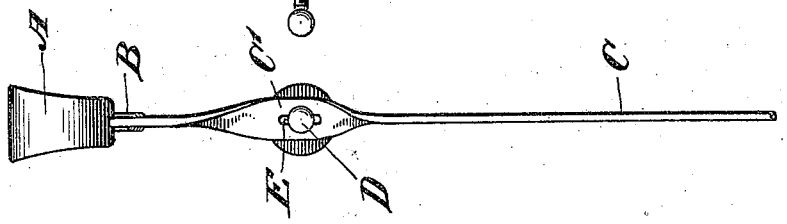
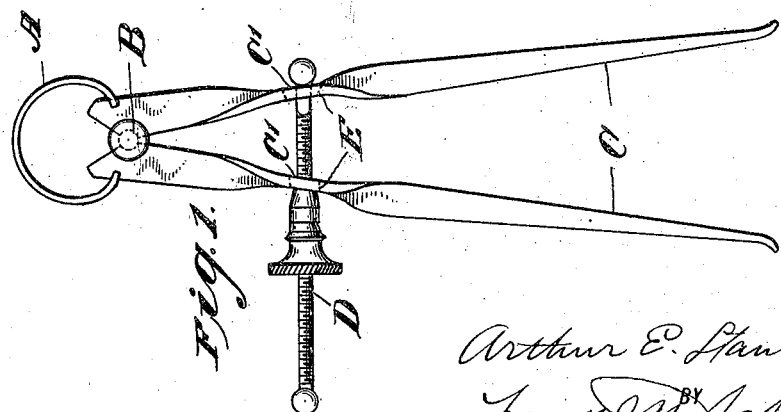
INVENTOR
Arthur E. Stanhope
BY
Frank M. Ashley
ATTORNEY

UNITED STATES PATENT OFFICE.

ARTHUR E. STANHOPE, OF BLOOMFIELD, NEW JERSEY.

CALIPERS.

1,237,114. Specification of Letters Patent. Patented Aug. 14, 1917.

Application filed October 30, 1916. Serial No. 128,371.

*To all whom it may concern:*

Be it known that I, ARTHUR E. STANHOPE, a citizen of the United States, and resident of Bloomfield, in the county of Essex and State of New Jersey, have invented certain new and useful Improvements in Calipers, of which the following is a specification.

My invention relates to calipers and the object of my invention is to provide spring calipers made of fewer parts than heretofore, and of such construction that they may be made at a lower cost and of pleasing design.

Referring to the drawings forming part of this application.

Figure 1. is a view of a caliper embodying my invention.

Fig. 2. is a side view of same.

Fig. 3. is a view of a modified form, and

Fig. 4. is a side view of the modified form.

A, indicates a spring of the usual construction used in spring calipers.

B, indicates the usual form of joint.

C—C indicates the legs of calipers or compasses.

The invention disclosed consists in forming flat surfaces C'—C' oppositely disposed by twisting the caliper legs a quarter turn and back again, respectively above and below the surfaces C'—C', as shown in Figs. 1. and 2., or a complete quarter turn as shown in Figs. 3. and 4., so that sufficient arch is provided to permit the threaded adjusting screw D to pass through openings E—E, found in the flattened portions, and still retain the stiffness of the legs above and below the adjusting screw.

Having thus described my invention, I claim as new and desire to secure by Letters Patent.

1. A spring caliper made of sheet material, the legs of which are twisted to provide flat portions disposed in planes parallel to the pivot axis of the legs, and having holes formed in said flat portions, and an adjusting screw extending through said holes, by means of which the caliper is adjusted.

2. A spring caliper made of sheet material a leg of which is twisted to provide a flat portion and having a hole formed therein, an adjusting screw extending through said hole and connected to the opposite leg, and a nut on said screw abutting said flat surface.

3. A caliper having legs formed of thin sheet material twisted to present flat portions disposed in planes parallel to the pivot axis of the legs, one of which is provided with an opening, a rod extending through said opening, and connected to the opposite leg, and an adjustment nut mounted on said rod to hold the members in adjusted relation.

Signed at New York in the county of New York and State of New York, this 28th day of October A. D. 1916.

ARTHUR E. STANHOPE.

Witnesses:
FRANK M. ASHLEY,
J. W. ANDERSON.

Copies of this patent may be obtained for five cents each, by addressing the "Commissioner of Patents, Washington, D. C."